United States Patent

Young

[15] 3,637,522

[45] Jan. 25, 1972

[54] PROCESS AND APPARATUS FOR TREATING OIL EMULSIONS

[72] Inventor: Noble E. Young, Box 383, Geismar, La. 70734

[22] Filed: July 16, 1968

[21] Appl. No.: 745,181

Related U.S. Application Data

[63] Continuation-in-part of Ser. No. 330,811, Dec. 16, 1963, abandoned.

[52] U.S. Cl.............................252/328, 252/349, 252/362, 252/348
[51] Int. Cl..........................................B01d 17/04
[58] Field of Search..................252/347, 349, 328, 362, 348, 252/363

[56] References Cited

UNITED STATES PATENTS

| 2,257,997 | 10/1941 | Barnes | 252/349 |
| 2,377,565 | 6/1945 | McDonald | 252/347 |
| 3,200,567 | 8/1965 | May | 252/175 |

FOREIGN PATENTS OR APPLICATIONS

| 753,102 | 7/1956 | Great Britain | 252/347 |

*Primary Examiner*—John D. Welsh
*Attorney*—Richards, Harris and Hubbard

[57] ABSTRACT

An oil-water-solid particles emulsion is separated by heating the emulsion to its critical separation temperature, thoroughly mixing and washing the heated oil with salt water to coagulate the emulsion water and solid particles into larger globules, increase the specific gravity of the globules and make the mixture homogeneous, then establishing vibratory waves in the mixture to accelerate separation of the mixture by gravity. Batch and continuous flow systems for carrying out the process, including a steam-operated jet pump injection system, are also disclosed.

11 Claims, 7 Drawing Figures

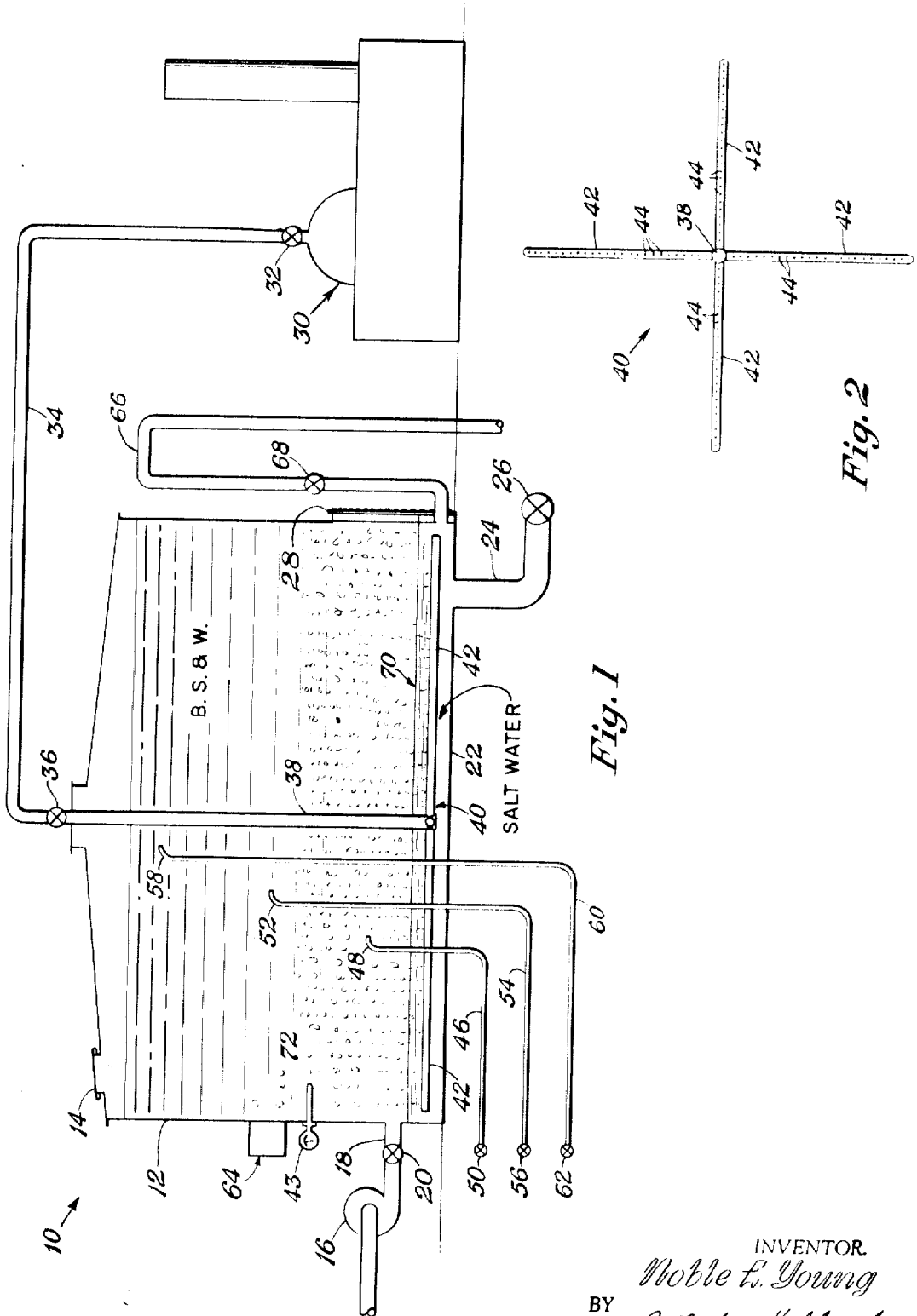

INVENTOR:
NOBLE E. YOUNG

Richards, Harris & Hubbard
ATTORNEY

3,637,522

PROCESS AND APPARATUS FOR TREATING OIL EMULSIONS

RELATED APPLICATION

This is a continuation-in-part application of Ser. No. 330,811, entitled "Process And Apparatus For Treating Basic Sediment and Water Emulsions," filed on Dec. 16, 1963, now abandoned.

BACKGROUND OF THE INVENTION

This invention relates to the art of processing crude petroleum and the like, and more particularly, relates to a novel system and process for separating crude oil from heavy sedimentary emulsions of crude oil, water and solid particles referred to in the industry as basic sediment and water.

When first removed from the ground, crude petroleum usually contains an emulsion of crude oil, water and very fine solid particles entrained from either the oil-bearing formation from the very fine drilling muds used in drilling the well. Much of the petroleum is sufficiently clean that it can be pumped directly to relatively large storage tanks where enough of the emulsion will settle out that the remaining crude oil will be accepted by the pipeline company which buys the oil for transmission to the refinery. The residue in the bottom of the tank is generally referred to as basic sediment and water, which is abbreviated B.S. & W.

The production from some oil wells, particularly in areas where secondary recovery techniques such as water flooding or fire flooding are used, have such a large proportion of water or other contaminants as to require additional treatment before placement in the storage tanks for the final settling process. For example, the crude oil may be allowed to rise through a heated wash tank which tends to break the emulsion and remove a major portion of the water and a considerable portion of the solid particles. Then the washed crude is placed in the storage tanks where additional amounts of the emulsion settle out. The sediment in the storage tanks and in the wash tank is that commonly referred to as B.S. & W. In at least one instance known to the inventor, crude oil produced by secondary recovery techniques was so contaminated that no known treating process was successful in cleaning the oil to pipeline standards.

The petroleum industry has long been aware that a considerable volume of oil is locked in these emulsions which have heretofore been very difficult to break. Many systems and techniques for preventing or reducing the formation of the emulsions, or for breaking the emulsions, have been tried. Heat, electricity and chemicals have all been employed with some degree of success. A complete history of the steps employed over the years is outlined in History of Petroleum Industry, American Petroleum Institute (1961), pp. 925-931.

The B.S. & W. emulsions are heavy and have the appearance and texture of a very wet and slimy mud at atmospheric temperatures. The quantity of water and solid particles suspended in the crude oil is usually on the order of 20 percent by volume. Pipeline companies as a rule will not purchase the crude oil if it contains more than 0.5 percent water and 0.3 percent solid particles by volume. Rather than attempt to process the emulsion, it is sometimes merely taken from the bottoms of the storage tanks or the wash tank and is piped into large pits dug in the ground where the B.S. & W. dries up and is ultimately covered over with dirt.

Various techniques for treating the emulsions using the chemicals have been practiced, but nearly all entail heating the emulsion, adding the chemicals, and permitting the water and solid particles to settle out. When using chemicals, only a batch process can be used, and treatment of a 1,000 bbl. batch usually requires from 24 to 36 hours to complete the settling process. In some instances the crude oil is still not sufficiently clean for sale to the pipelines and must be reprocessed. Due to the relatively long period required for treating a batch using this technique and the relatively high cost of the chemicals, these processes are very marginal from an economical standpoint.

SUMMARY OF INVENTION DISCLOSED

The present invention concerns a novel process and apparatus for reclaiming the crude oil from B.S. & W. emulsions, or any other crude oil emulsion, without the use of chemicals. The process entails heating the emulsion to a minimum critical separation temperature, usually from about 120° to about 160° F., depending upon the emulsion, thoroughly washing the emulsion with salt water to agglomerate the emulsion water and solids in droplets of higher density, and then inducing vibratory waves in the emulsion while maintaining the emulsion substantially stagnant to cause the water and solid particles to settle and separate from the crude oil.

In accordance with a specific aspect of the invention, the emulsion is simultaneously heated and washed by injecting steam into a layer of salt water initially underlying the emulsion so as to thoroughly mix the emulsion with the additional water condensed from the steam and the salt water to both wash the emulsion and insure that the gravity of the water in the emulsion is sufficiently high to permit gravity separation. Some mixtures can then be separated within a commercially feasible period by permitting the solutions to stand in a tank, while others require vibration to accelerate the separation to a commercially acceptable period.

In accordance with another specific aspect of the invention, the emulsion is washed by hot jets of salt water to agglomerate the emulsion water and solid particles in globules of relatively high density which can then be separated by gravity and/or vibratory waves. The novel process can be carried out on either a batch or a continuous flow basis.

The present invention also contemplates a novel system for practicing the invention as a batch process. The batch process system comprises a container, means for introducing the emulsion to the container, means for heating the emulsion, and means for inducing vibratory waves in the emulsion in the container. A specific aspect of the invention relates to a means for injecting steam into the emulsion in the container comprised of a spreader manifold disposed adjacent the bottom of the container having a plurality of nozzle means for directing the steam upwardly within the container through the layer of salt water so that the steam jets will assist in agitating and mixing the emulsion, salt water and steam water.

Another aspect of the invention is a system for practicing the present invention as a continuous flow process The continuous flow system comprises first and second containers, means for introducing the emulsion to the first container, means for heating the emulsion in the first container, means for transferring the emulsion from the first container to the second container, means for inducing vibratory waves in the emulsion in the second container, and means for withdrawing crude oil from the top of the second container and means for withdrawing sediment from the bottom of the second container. A specific aspect of the continuous flow system relates to means for injecting salt water into the emulsion in the first tank and means for injecting steam into the emulsion in the first tank to heat the emulsion and mix the salt water, steam water and emulsion. In accordance with still another specific aspect of the invention, a jet of heated salt water is directed into the emulsion by a series of steam-operated jet pumps.

Therefore, an important object of the present invention is to provide a process and system for economically reclaiming crude oil from even the most difficult-to-break emulsions.

Another object of the present invention is to provide a process of the type described which utilizes no chemicals to facilitate the separation and reclamation process.

Yet another object of this invention is to provide a process of the type described which can be carried out in a much shorter time period than has heretofore been the case with processes utilizing chemicals, and which is therefore considerably more economical.

Another object of this invention is to provide a process of the type described which can be carried out either on a continuous flow or batch process basis.

Another object of the present invention is to provide a novel process for heating and cleaning emulsions preparatory to additional separation treatments.

Still another object of the present invention is to provide a batch system for treating crude oil emulsions.

Yet another object of this invention is to provide a continuous flow system for treating crude oil.

BRIEF DESCRIPTION OF THE DRAWINGS

Many additional objects and advantages will be evident to those skilled in the art from the following detailed description and drawings wherein:

FIG. 1 is a schematic drawing of a system for treating crude oil emulsions, or the like, in accordance with the batch process of the present invention;

FIG. 2 is a plan view of the steam manifold of the system of FIG. 1;

DESCRIPTION OF PREFERRED EMBODIMENTS

Figure 3:
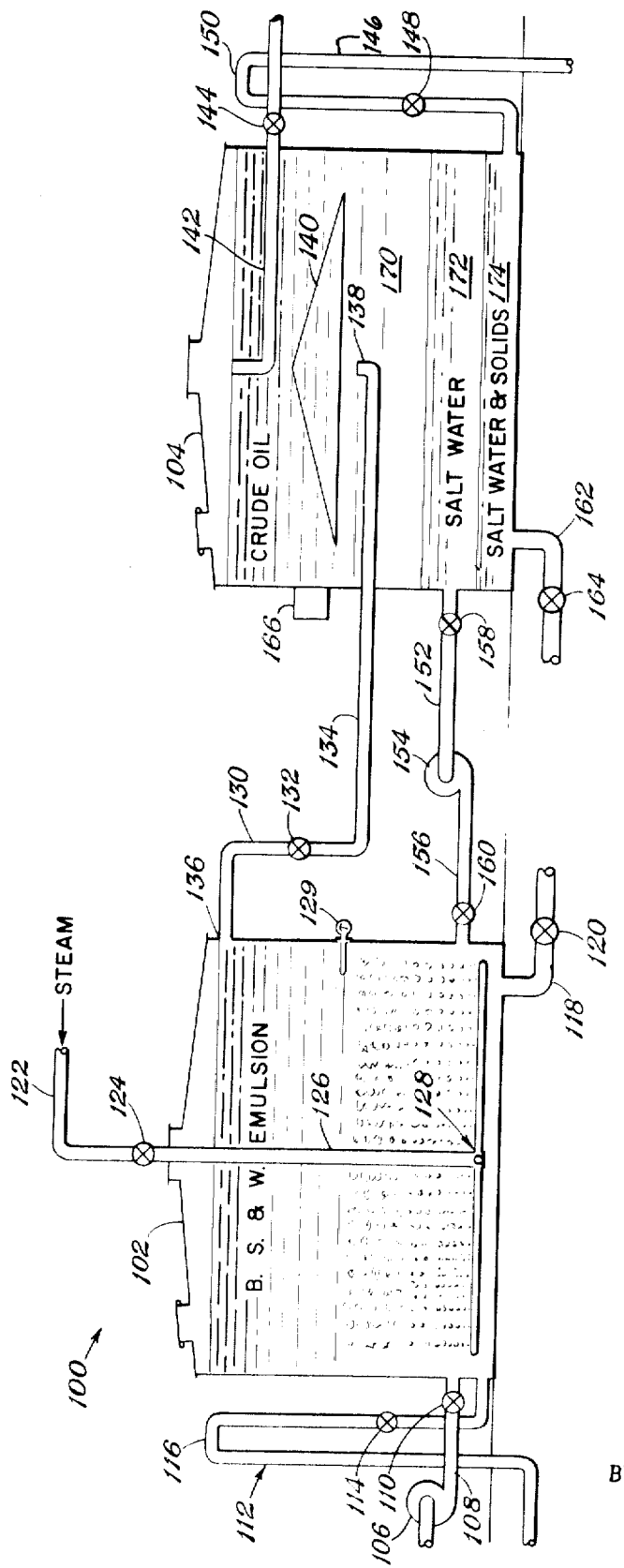
FIG. 3 is a schematic drawing of another system for treating crude oil in accordance with the continuous flow process of the present invention.

Referring now to the drawings, and in particular to FIG. 1, a batch process system for treating crude oil in accordance with the present invention is indicated generally by the reference numeral 10. The system 10 comprises a relatively large tank 12, which preferably is a standard 1,000 bbl. tank used in the petroleum industry. The tank 12 is completely closed to the atmosphere except for a standard 6-ounce thief hatch 14 which will maintain the pressure within the tank 12 6 ounces above atmospheric pressure.

A means for introducing emulsion to the tank 12 and withdrawing processed oil from the tank is comprised of a suitable transfer pump 16 and a conduit 18 which may be closed by a valve 20. The conduit 18 preferably enters the tank 12 approximately 18 inches above the bottom 22 of the tank. A suitable means for withdrawing sediment from the bottom of the tank is comprised of the conduit 24 and the valve 26. The tank may also include a conventional bolted plate 28 for gaining access to the tank for cleaning solid residue from the bottom of the tank in the conventional manner.

A novel means for heating the emulsion within the tank 12 is comprised of a conventional steam boiler 30 and means for injecting the steam into the emulsion in the tank 12 comprised of a valve 32, conduit 34, valve 36, conduit 38 and distribution manifold indicated generally by the reference numeral 40. It will be noted that the conduit 38 extends vertically downwardly through the center of the tank and conveniently supports the manifold 40.

The distribution manifold 40 is preferably comprised of a plurality of conduits 42 which extend horizontally and radially from the conduit 38 substantially as illustrated in FIG. 2. The conduits 42 are provided with a plurality of upwardly facing nozzles 44 which are sized to maintain a suitable pressure within the manifold, and which are so spaced and progressively sized from the conduit 38 to the outer extremities of the conduit 42 as to emit substantially equal quantities of steam in order to promote uniform mixing and heating throughout the tank 12. A temperature gauge 43 may be provided for indicating the temperature of the emulsion in the tank.

A vibrator 64 is suitably disposed to induce vibratory waves in the emulsion within the tank 12, and may conveniently be attached to the wall of the tank. The vibrator may be relatively small and preferably has an operating frequency in the low audible and subaudible range. The frequency is preferably adjusted to the resonant frequency of the tank 12 when filled with emulsion so as to impart maximum energy to the emulsion. A frequency which causes visible wave motion of the surface of the emulsion has produced outstanding results.

Suitable means are preferably provided for sampling the emulsion at different levels within the tank 12. For example, the small conduit 46 is connected to an ell 48 which opens at a point adjacent the bottom of the tank 12 and has a valve 50 for withdrawing emulsion samples from this level of the tank. A similar ell 52 is disposed at an intermediate point within the tank 12 and is connected by a conduit 54 to a valve 56 for withdrawing samples from the center level of the tank, and an ell 58 is disposed adjacent the top of the tank and is connected by the conduit 60 to the valve 62 for withdrawing samples from the upper level. A water leg 66 having a valve 68 is provided for maintaining the desired depth of salt water in the tank for purposes which will presently be described. Suitable sight glasses (not illustrated) can be provided to observe this level if desired.

The process of the present invention can best be described by referring to the system 10, and a description of the novel process will serve to explain the operation of the system 10. Before the emulsion is introduced to the tank 12 by the transfer pump 16, the boiler 30 should be fired until a head of steam of the desired pressure is attained. The tank 12 is filled with a layer of salt water 70 to depth of approximately 1 foot or to a sufficient depth to cover the steam injection manifold 40, but not to cover the emulsion inlet conduit 18. The emulsion 72 is pumped into the tank by opening the valve 20 and actuating the transfer pump 16. After 3 or 4 feet of emulsion has been pumped into the tank 12, the valves 32 and 36 in the steam line are opened and steam is injected from the nozzles 44 upwardly through the layer of salt water 70 into the emulsion. At first the relatively cool salt water and emulsion almost immediately condense the steam so that very little agitation takes place. However, as the salt water 70 and emulsion 72 are heated by the steam, less of the steam is condensed, and the combined forces of the steam ejected from the nozzles 44 and the buoyancy of the steam cause the emulsion 72 to be rolled and agitated very thoroughly. In fact, by the time the tank 12 is full of emulsion, it is usually necessary to throttle down the supply of steam by closing the valve 36 to prevent the agitation from becoming so violent as to rupture the tank 12.

As the steam rises through the emulsion 72, the salt water 70 is mixed with the steam and carried upwardly to mix with the salt water within the emulsion. This increases the specific gravity of the emulsion water and also tends to coagulate the emulsion water as well as wash the solid particles from the crude oil.

At some time after the emulsion 72 has been thoroughly mixed, samples are taken from the bottom, middle and upper layers of the tank through the valves 50, 56 and 62, respectively. The samples are heated and centrifuged. If the quantity of water and solid particles is the same in each sample, then it is evident that the emulsion 72 is thoroughly mixed. The thorough mixing is desirable because the emulsion 72 will nearly always be taken from a number of different sources each of which may have a different specific gravity and a different ratio of crude oil to water and foreign particles. It is important that the mixture within the tank be substantially homogeneous to achieve the best separation. It is essential that the entire emulsion 72 be heated to the critical temperature for the mixture rather than to the critical temperature for a component part of the mixture.

After the emulsion 72 is thoroughly mixed and is substantially homogeneous throughout, another sample is taken and is heated and centrifuged to determine the critical separation temperature of the emulsion. I have discovered that very little separation occurs in any given emulsion until a certain critical temperature is reached at which point the separation by vibratory waves in the emulsion will take place. For example, if a sample of the emulsion is placed in a centrifuge container, virtually no separation can be attained until the critical temperature is reached. However, once the critical temperature is reached and the vibration is introduced, the separation can be accomplished. The critical temperature for a light crude oil emulsion may range as low as about 120° F, while some heavy crude emulsions may have a critical temperature of about 180° F. However, 150° F. will be sufficient to separate most crude oil emulsions such as those in which the crude oil has a gravity between 10°–45° API and which are as high as 20–25 percent water and solid particles.

After the minimum critical separation temperature for the thoroughly mixed emulsion 72 is reached within the tank 12, the injection of steam from the manifold is stopped by closing the valve 36. The valve 32 should also be closed for safety reasons. The vibrator 64 is then actuated to vibrate the walls of the tank 12 and induce vibratory waves in the emulsion 72. The emulsion 72 is maintained stagnant except for the vibratory waves and is permitted to cool at a relatively slow rate. The vibration causes the emulsified water to coagulate and settle out of the crude oil. Due to the unusual extent to which solid particles are cleaned from the crude oil, and solid particles are usually the most difficult to remove, it is believed that the washing process caused by the injection of steam collects most of the solid particles in the water droplets which settle out. The vibration is continued until the desired separation is attained, then the clean crude oil can be withdrawn from the conduit 18.

In general, most emulsions will be thoroughly separated after 4 to 8 hours of vibration. This compares with 24 to 36 hours separation period required when using chemicals. Crude oil emulsions having gravities from 10°–45° API and as high as 25 percent water and solid particles have been successfully processed in the manner described. The crude oil processed in this manner is in every case much cleaner than can be attained by the previous treating techniques utilizing chemicals. In several instances, emulsions vibrated for approximately 8 hours have resulted in crude oil so clean that no water or solid particles were detectable by standard centrifuge tests. The oil will usually meet pipeline requirements after about 4 hours.

Referring now to FIG. 3, another system constructed in accordance with the present invention for treating crude oil emulsions on a continuous flow process is indicated generally by the reference numeral 100. The system 100 is comprised of a heating and mixing tank 102 and a vibrating and settling tank 104. A transfer pump 106 is connected to a conduit 108 and a valve 110 for pumping emulsion into the tank 102. A water leg 112 for controlling the level of salt water in the tank 102, or more specifically the average specific gravity of the emulsion, is connected to the bottom of the tank and is provided with a valve 114. The upper portion 116 of the water leg 112 can be adjusted in the conventional manner to a height which will provide a column of salt water or heavy fluid of any height to counterbalance the column of fluid in the tank 102 and thereby control the relative proportion of salt water and emulsion in the tank. A suitable drain 118 may be connected to the bottom of the tank 102 and provided with a valve 120 for cleaning sediment from the tank.

A source of steam (not illustrated) such as the boiler 30 of the system 10 is connected by a steam line 122 and a suitable valve 124 to a downwardly extending conduit 126. A manifold 128, which may be of identical construction to the manifold 40 illustrated in FIGURE 2, is connected to the lower end of the conduit 126 and provides a means for injecting steam into the emulsion in the tank 102. As previously mentioned in connection with the manifold 40, the steam is preferably directed upwardly through the emulsion to assist in mixing the steam water with the emulsion. A temperature gauge 129 may be provided to indicate the temperature of the emulsion in the tank 102.

A suitable means for transferring the emulsion from the tank 102 to the tank 104 is comprised of a conduit 130, a valve 132, and a conduit 134. The conduit 130 is connected to a point 136 adjacent the top of the tank 102. The conduit 134 preferably extends to a midpoint of the tank 104 and may terminate either in a suitable spreader or at a central inlet 138 substantially as illustrated. A suitable plate 140 is preferably provided above the inlet 138 to divide the tank 104 generally into upper and lower zones. The plate 140 may be conically shaped so that any sediment dropping from the oil above the plate will find its way to the bottom of the tank 104.

A conduit 142 having a valve 144 is provided for removing clean crude oil from the top of the tank 104. A water leg 146 having a valve 148 is connected to the bottom of the tank 104 and has an upper portion 150 extending approximately to the upper level of the tank 104 for controlling the level of salt water in the tank 104 in the conventional manner.

A suitable means for recycling salt water from the tank 104 to the tank 102 may comprise a conduit 152 which withdraws the salt water from a lower level of the tank 104, a pump 154, and an injection line 156 which is preferably connected to the bottom of the tank 102 just above the steam manifold 128. Valves 158 and 160 may be provided in the lines 152 and 156, respectively. A drain line 162 having a valve 164 may be connected to the bottom of the tank 104 for cleaning purposes.

A vibrator 166 is connected to the wall of the tank 104. The vibrator 166 may be of the same type as the vibrator 64 previously described in connection with the batch process system 10 and preferably operates in the low audible and subaudible frequencies. A relatively small motor is sufficient to vibrate a 1,000 bbl. tank, and a vibrator of the type used on vibrating reclining chairs is adequate. It is also desirable for the vibrating motor 166 to have a variable frequency. Then the frequency should be adjusted until the resonant frequency of the tank 106 is found so as to induce maximum vibratory energy to the tank 104. As the walls of the tank 104 are vibrated, vibratory waves will be induced in the emulsion by the walls of the tank as well as the plate 140, which is connected to the walls of the tank.

The continuous flow process in accordance with the present invention can best be described by referring to the system 100, and the description of the process will also serve to describe the operation of the system 100. Before the system 100 is placed in operation, a layer of salt water should be provided in the bottom of the tank 102 to cover the steam injection manifold 128. The emulsion is pumped into the tank 102 by the transfer pump 106, and steam is injected through the layer of salt water into the crude oil emulsion. The injected steam both heats and thoroughly mixes the steam water, salt water and emulsion within the tank 102 as previously described. The retention time within the tank 102 and the quality of steam introduced through the manifold 128 can be regulated so as to insure that the emulsion will be heated to the minimum critical temperature heretofore defined in connection with the batch process of system 10. As the salt water and steam are mixed with the crude oil emulsion, the crude oil is washed, the specific gravity of the water tends to be increased, and the minute droplets of water tend to be coagulated.

The thoroughly mixed emulsion then spills over into the conduit 130 and passes by gravity through the valve 132 and conduit 134 and into the tank 104 at the point 138. It will be appreciated that the level of the fluid within the settling tank 104 must be lower than the level of the fluid within the heating and mixing tank 102 in order for this transfer to occur. The vibrator 166 is in continuous operation. As the heated and mixed emulsion is introduced to the tank 104, it becomes substantially stagnant due to the relatively large volume of the tank 104, and the water and solid particles immediately begin to settle and separate from the crude oil.

The plate 140 prevents the incoming emulsion from the outlet 132 from agitating the crude oil in the upper portion of the tank. The zone 170 below the plate 140 is largely emulsion which is stagnant and from which salt water and solid particles settle. A layer of salt water 172 having an ill-defined layer of solid particles 174 will form in the bottom of the tank 104.

Clean crude oil will pass around the edges of the plate 140 so that the upper portion of the tank adjacent the end of the conduit 142 will be substantially clean crude oil.

As the fluid is introduced to the tank 104, clean crude oil is continuously removed through the conduit 142. Excess salt water and solid particles are continuously removed through the water leg 146. In this connection, the level of the upper portion 150 of the water leg 146 is adjusted to control the depth of the salt water layer 172.

Salt water is also preferably recycled from the layer 172 to the mixing and heating tank 102 by means of the transfer pump 154 so as to insure that the gravity of the water within the tank 102 is always at a high level. In this connection, if the salt water suspended within the emulsion being treated does not have a high gravity, it may be desirable to add salt to the system from time to time to insure that the water will have a relatively high specific gravity and settle at a more rapid rate from the emulsion.

Figure 4:
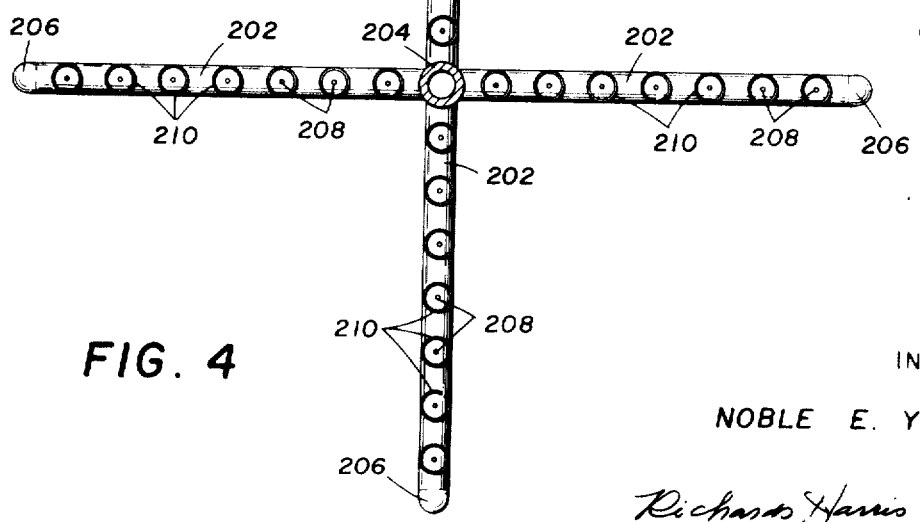
FIG. 4 is a plan view of an injection manifold which can be used in either of the systems of FIGS. 1 or 2.

An improved injection manifold is indicated generally by the reference numeral 200 in FIG. 4. The injection manifold 200 may be substituted for the manifold 40 in the apparatus of FIG. 1, or for the manifold 128 in the apparatus of FIG. 3. The manifold 200 has four radially extending steam conduits 202 which are in fluid communication with and which are supported by a vertically extending supply conduit 204, which is connected to a source of steam under pressure.

Figure 5:
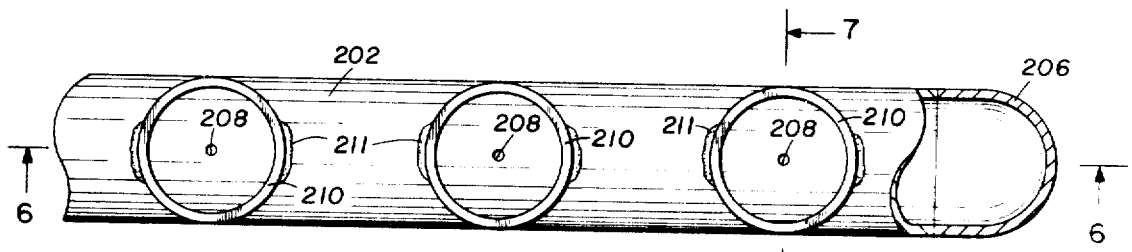
FIG. 5 is an enlarged top view of a portion of the manifold of FIG. 4.
Figure 6:
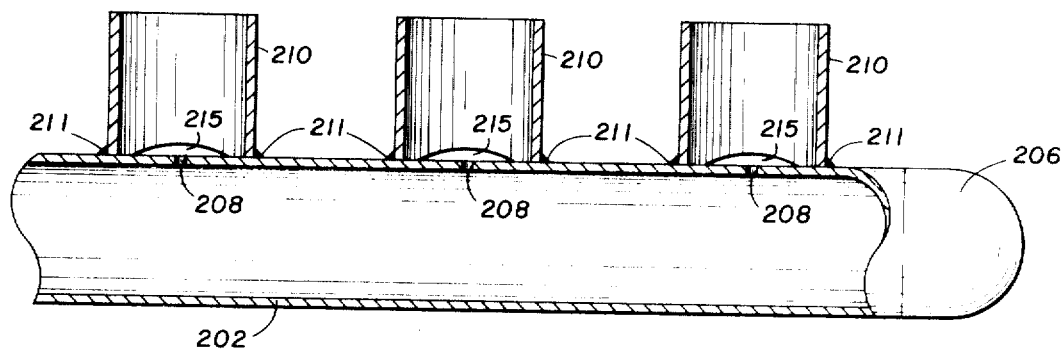
FIG. 6 is a sectional view taken substantially on lines 6—6 of FIG. 5.
Figure 7:
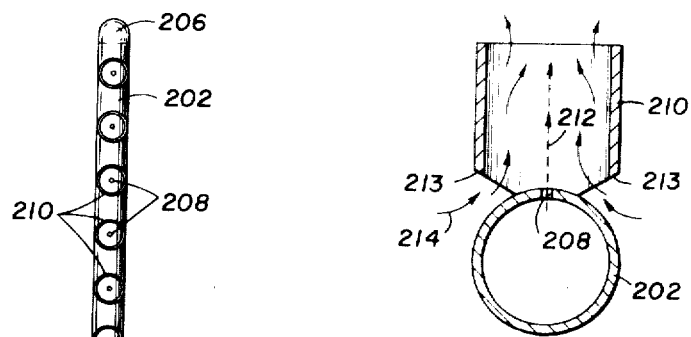
FIG. 7 is a sectional view taken substantially on lines 7—7 of FIG. 5.

The conduits 202 are identical and are illustrated in FIGS. 5–7. Each of the conduits is comprised of a length of pipe the outer end of which is closed by a cap 206. A number of orifices 208 are formed at equally spaced points along the top surface of the conduit 202. A sleeve 210 is disposed concentrically with each of the orifices 208 and is welded to the leg 202 at 211. Both the lower and upper ends of the sleeves 210 are open. The size of the openings at the lower ends of the sleeves is preferably increased by making diagonal cuts 213 as best seen in FIG. 7, to produce the arcuate openings 215 shown in FIG. 6. Each combination of a restrictive orifice 208 and sleeves 210 forms a fluid jet pump the operation of which will presently be described.

In test apparatus, both the legs 202 and the sleeves 210 were made from 2-inch line pipe. The orifices 208 were bored on 4-inch centers. Using a steam working pressure of from 73 to 100 p.s.i., the orifices were seven thirty-seconds inch in diameter for a 1,500-barrel tank, three-sixteenth inch in diameter for a 1,000-barrel tank, and five thirty-seconds inch in diameter for a 500-barrel tank.

In carrying out the process of the present invention using the manifold 200, the manifold is initially disposed within a layer of salt water which underlies the layer of emulsion to be treated. Steam introduced to the manifold 200 jets out the orifices 208, as represented by dotted arrows 212. Salt water is drawn in through the lower end of the sleeve 210 and pumped out the top end, as represented by arrows 214, by the combined effects of the heating of the salt water and the force of the steam jet. When the process is first started, the salt water is relatively cool and the steam is quickly condensed. As a result, the salt water is pumped upwardly at a relatively slow rate and with relatively low force. However, as the salt water is heated by the steam, the salt water is jetted upwardly in increasing volumes and with increasing force. The upwardly directed jets of hot salt water progressively penetrate the overlying layer of emulsion to greater heights until finally the layer of salt water and the body of emulsion are thoroughly mixed and are substantially homogeneous. Of course, both the emulsion and the salt water are both pumped through the sleeves 210 as the salt water and emulsion are progressively mixed. The injection manifold 200 has proven to be considerably more efficient than the manifold 40.

From the above-detailed descriptions of several preferred embodiments of the present invention, it will be evident that a novel and highly useful process for treating crude oil emulsions has been described. The process has been described in connection with the processing of B.S. & W. which is the most difficult crude oil emulsion to break and which is very frequently disposed of as waste. However, it is to be understood that the novel process can also be used to process emulsions which are less difficult to break, and can be used in the dehydration and decontamination of crude oil in general. In particular it is contemplated that the process can be used to treat crude oil flowing directly from the wellhead on a continuous flow basis. Novel systems for treating crude oil using either a batch or continuous flow process have also been described. A novel system and process for simultaneously heating, mixing and washing the crude oil by the use of steam which is very safe and is particularly adapted to the process of the present invention has also been described.

Although several preferred embodiments of the invention have been described in detail, it is to be understood that various changes, substitutions and alterations can be made therein without departing from the spirit and scope of the invention as defined by the appended claims.

What is claimed is:

1. The process for resolving emulsions of oil, water and solid particles comprising the steps of:
   injecting steam through a layer of salt water having a gravity substantially greater than pure water into the emulsion to mix the water condensed from the steam, the salt water, and the water in the emulsion and wash the solid particles from the crude oil until the emulsion is heated to a temperature in excess of about 120° F. and the mixture is substantially homogeneous, and then
   inducing vibratory waves in the emulsion while maintaining the emulsion substantially stationary to cause the water and particles to settle and separate from the crude oil.

2. The process for resolving emulsions of crude oil, water and solid particles comprising the steps of:
   filling a container with a layer of salt water having a gravity substantially greater than pure water and a layer of the emulsion over the salt water,
   injecting steam into the layer of salt water such that the steam will mix with the salt water and carry the salt water upwardly into the emulsion to wash the emulsion until the emulsion is heated to a temperature in excess of about 120° F. and the mixture is substantially homogeneous, then discontinuing injection of the steam, and then
   inducing vibratory waves into the emulsion to cause the water and solid particles to settle and separate from the crude oil.

3. The process for resolving emulsions of crude oil, water and solid particles comprising the steps defined in claim 2 wherein:
   the steam is injected upwardly into the layer of salt water to assist in mixing the salt water, steam and emulsion.

4. The process for resolving emulsions of crude oil, water and solid particles comprising the steps defined in claim 2 wherein:
   the vibratory waves are induced in the emulsion by vibrating the walls of the container.

5. The process for resolving emulsions of crude oil, water and solid particles comprising the steps defined in claim 2 wherein the steam is injected upwardly through a vertically disposed, open-ended sleeve initially submerged in the salt water to pump the salt water upwardly into the emulsion.

6. The continuous flow process for resolving emulsions of crude oil, water and solid particles comprising the steps of:
   introducing emulsion to a first container,
   heating the emulsion while in the first container to a temperature in excess of about 120° F. by injecting a mixture of steam and salt waver having a gravity substantially greater than pure water into the emulsion,
   transferring the heated emulsion to a second container,
   inducing vibratory waves in the emulsion in the second container while maintaining the emulsion substantially stationary to cause the water and solid particles to settle and separate from the crude oil,
   removing the crude oil from the upper portion of the second container, and removing water and solid particles from the bottom portion of the second container.

7. The process for treating an emulsion of oil preparatory to separating the oil from the impurities, comprising:

mixing heated salt water with the emulsion until the mixture is substantially homogeneous, heating the mixture to a temperature in excess of about 120° F., and then allowing the mixture to separate by gravity.

8. The process defined in claim 7 wherein the mixture is heated by the salt water.

9. The process defined in claim 7 wherein the salt water is injected into the emulsion as an upwardly directed fluid jet.

10. The process defined in claim 7 wherein the salt water is heated and injected into the emulsion by mixing the salt water with steam.

11. The process defined in claim 7 wherein the mixture is subjected to vibratory waves as it is allowed to separate by gravity.

* * * * *